United States Patent Office 2,946,349
Patented July 26, 1960

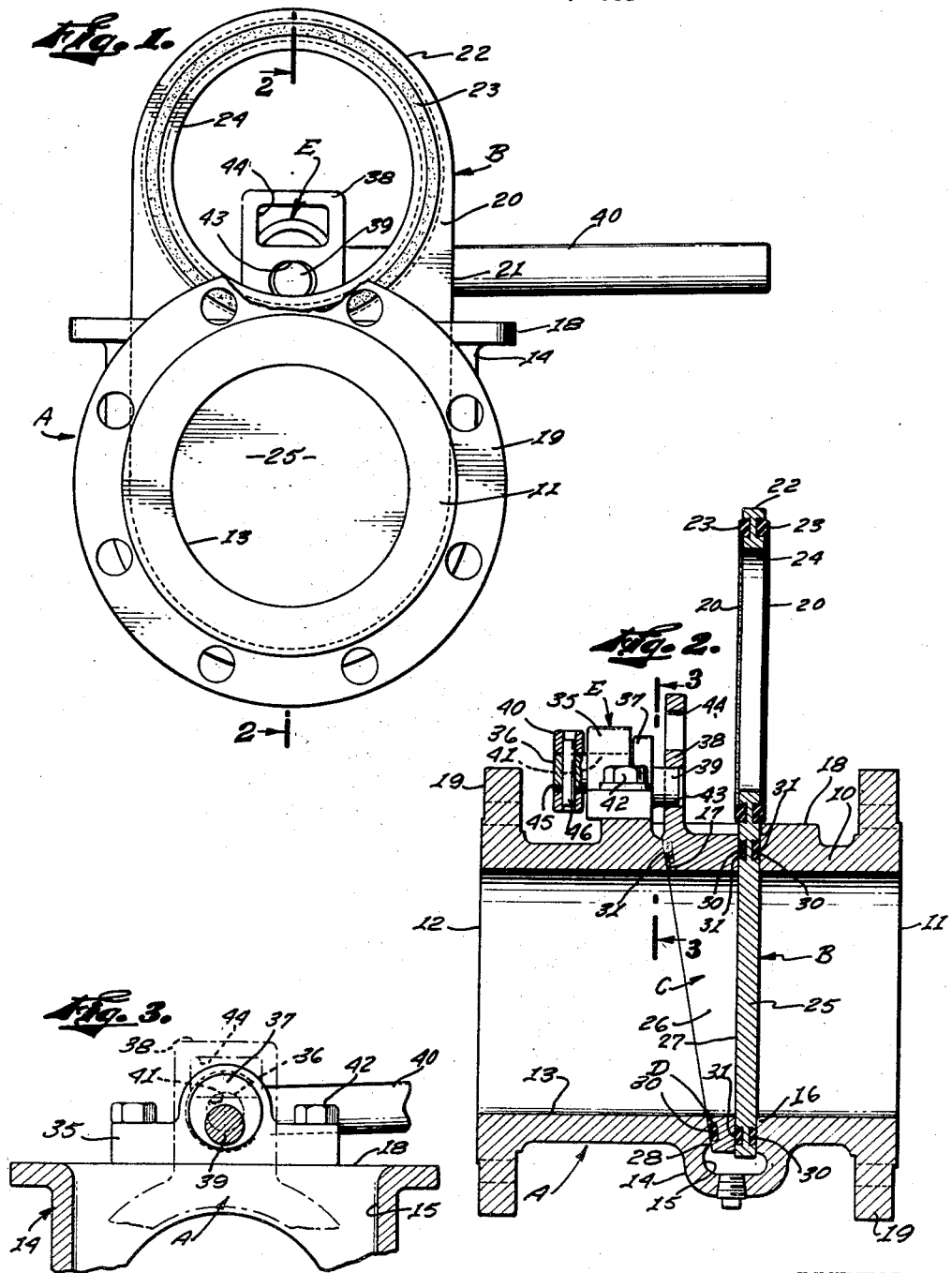

2,946,349

FAST OPERATING PLATE VALVE

Leland S. Hamer, Long Beach, Calif., assignor to Chiksan Company, Brea, Calif., a corporation of California Filed Jan. 13, 1958, Ser. No. 708,510

8 Claims. (Cl. 138—94.3)

This invention relates to a visible plate valve and is more particularly concerned with a novel, fast operating plate valve construction.

The ordinary visible plate valve construction involves, generally, an elongate body having a central, longitudinal flow passage extending therethrough, an upwardly opening chamber intersecting the flow passage intermediate the ends of the body, an elongate, plate-type valve member shiftably engaged in the chamber to control the flow of fluid through the body, a shiftable clamp member in the chamber to act between the body and the valve element, sealing means adapted to seal between the plate, clamp member and the body, and actuating means adapted to shift the clamp member into and out of tight clamped and sealing engagement with the body and valve member.

In the ordinary visible plate valve of the character referred to above, the clamping member and actuating means are slow to operate and generally involve screw means and the like, which are subject to becoming rusted and/or packed with foreign matter which further makes operation of the construction slow and difficult.

An object of the present invention is to provide a visible plate valve having a novel, quick operating actuating means.

Another object of the present invention is to provide a valve construction of the character referred to having an actuating means which is highly effective and dependable in operation and which is not subject to becoming fouled as by rust or the accumulation of foreign matter thereabout.

A further object of the present invention is to provide a valve construction of the character referred to which involves a minimum number of parts, each of which is both easy and economical of manufacture and which provides a valve construction which is tough, durable and highly effective and dependable in operation.

The various objects and features of my invention will be fully understood from the following detailed description of a typical preferred form and application of my invention, throughout which description reference is made to the accompanying drawings, in which:

Fig. 1 is an end elevational view of the fast operating plate valve of the present invention.

Fig. 2 is a longitudinal sectional view of my new valve construction taken as indicated by line 2—2 on Fig. 1.

Fig. 3 is a detailed view of a portion of the valve of the present invention, showing parts thereof in phantom lines to better illustrate the construction and taken substantially as indicated by line 3—3 on Fig. 2.

The visible plate valve of the present invention includes generally, an elongate fluid handling body A, an elongate valve member B shiftably engaged in the body A to control the flow of fluid therethrough, a clamp element C shiftably carried by the body and engageable with the valve member B, sealing means D adapted to seal between the body A, the valve member B and the clamp element C, and actuating means E adapted to urge the clamp element C into and out of tight sealing engagement with the body A and the valve member B.

The body A is an elongate horizontally disposed member having an elongate body section 10 with upstream and downstream ends 11 and 12, a central, longitudinally disposed flow passage 13 extending therethrough, and having an enlargement 14 intermediate its ends and defining an upwardly opening chamber 15, which chamber extends transversely of the body and intersects the flow passage 13.

The upstream end of the chamber 15 is provided with a flat, vertically disposed, annular seating face 16, which face is concentric with and surrounds the flow passage 13. The downstream end of the chamber 15 is provided with a flat, inclined, annular seating face 17, which face is concentric with and surrounds the flow passage 13 and converges downwardly towards the opposed seating face 16. The seating faces 16 and 17 are established by extensions of the body section 10 which project longitudinally into the chamber 15, which chamber intersects and interrupts the continuity of the body section 10.

It is to be understood that the terms upstream and downstream are used throughout this description for the purpose of better describing the structural relationship of parts and that in practice fluid can flow in either direction through the construction without in any way affecting its satisfactory operation.

The upper end of the enlargement 14 which establishes the upwardly opening chamber 15 is provided with a flat, horizontally disposed flange 18. The flange 18 projects outwardly from the extension and surrounds the upper open end of the chamber 15.

In the preferred carrying out of the invention, suitable flat, vertically disposed mounting flanges 19 are provided at the opposite ends of the body section 10 to facilitate mounting the body between opposed, axially aligned flanged pipe sections in a pipe line, or the like.

The valve member B is an elongate, plate-like member having flat, vertically disposed sealing faces 20, vertically disposed side edges 21 and rounded ends 23. One end portion of the member B is provided with an aperture or opening 24 which corresponds in diametric extent with the flow passage 13 in the body, while the other end portion 25 of the plate is plain or imperforate.

The valve member B is adapted to be arranged with one of the end portions thereof engaged in the chamber 15 adjacent the upstream seating face 16 in the chamber. When the imperforate end portion 25 is engaged in the chamber 15 of the body A, as illustrated throughout the drawings, the valve member shuts off the flow of fluid through the flow passage 13 in the body. When the other or apertured end portion of the valve member B is engaged in the chamber 15 of the body, the aperture or opening 24 therein registers with the flow passage 13 in the body and allows for the free flow of fluid through the body.

The clamp element C engaged in the chamber 15 is a substantially disc-shaped member adapted to extend transversely of the body and has a central opening 26 extending therethrough, a flat, vertically disposed upstream sealing face 27 opposing the sealing face 20 on the downstream side of the valve element B, and a flat, inclined, downstream sealing face 28 opposing the inclined downstream seating face 17 in the chamber. The inclined face 28 converges downwardly towards the vertical sealing face 27.

The opening 26 in the clamp element C corresponds in diametric extent with the opening 24 in the valve member B and the flow passage 13 in the body A and allows for free, uninterrupted flow of fluid through the body when it is fully engaged therein.

With the above relationship of parts, it will be apparent that the clamp member C is in the nature of an annular wedge, and that when it is urged downwardly in the chamber 15, it establishes tight engagement between the downstream seating face 17 in the body and the valve member B and urges the valve member B into tight clamped engagement on the upstream seating face 16 in the body.

The sealing means D adapted to seal between the clamp member C, valve element B and the body A is shown as including an annular groove 30 in the sealing face of the clamp member C and in the oppositely disposed sealing faces 20 at each end portion of the valve element B; and annular sealing rings 31 in the grooves 30 to normally project therefrom. The sealing rings 31 are adapted to establish pressure tight sealing engagement on the opposing surfaces of the body and the clamp member when the clamp member is urged downwardly into tight wedging engagement in the chamber.

In practice, if desired, the sealing means could involve annular sealing rings carried in annular grooves provided in the sealing face 27 of the clamp member C and in the upstream sealing face 16 of the body A, in which case the sealing faces 20 of the valve element B would be uninterruptedly flat. However, due to the difficulty of establishing suitable sealing ring carrying grooves in the body A and due to the relative unaccessibility of sealing rings carried by the grooves in the body, it is preferred that the rings be carried by the clamp element and valve member as illustrated in the drawings and as described above.

The actuating means E adapted to urge the clamp member C into and out of tight wedging and sealing engagement between the seating face 17 of the body and the valve element B is a crank and lever mechanism and is shown as including, generally, a bearing block 35 fixed to the body, a shaft 36 rotatably carried by the block 35, a crank 37 on the shaft, a projection 38 on the clamp member, a drive pin 39 carried by the crank and engaging the projection 38 on the clamp member C, and a hand lever 40 fixed to the shaft and operable to rotate the shaft and the crank member in a manner to shift the clamp member C as desired.

The block 35 of the actuating means E is a simple, elongate, horizontally disposed block and is provided with a horizontally disposed, transverse bearing opening 41 extending therethrough. The block 35 is releasably secured to the flange 18 on the enlargement 14 of the body A, adjacent the downstream side of the upper open end of the chamber 15. The block 35 is shown secured to the flange 18 by means of suitable screw fasteners 42 and so that the bearing opening 41 therein extends parallel with the central longitudinal axis of the body and in a common vertical plane therewith.

The shaft 36 is a simple, round shaft of limited longitudinal extent and is rotatably engaged in the bearing opening 41 in the block to extend therethrough and to project from the opposite sides thereof.

The crank 37 of the means E is shown as a simple, disc-shaped enlargement projecting radially from the end of the shaft 36 adjacent the upper open end of the chamber 15 which is defined by the enlargement 14 of the body A.

The projection 38 on the clamp member C is a simple, flat, vertically disposed, plate-like projection and is provided with a pin receiving opening 43 therein. The central longitudinal axis of the opening 43 extends parallel with the longitudinal axis of the body A.

In the case illustrated, the projection 38 projects or continues a substantial distance above the opening 43 therein and is provided with an enlarged aperture 44. The aperture 44 is adapted to receive a suitable tool, or the like, to facilitate removal and manipulation of the clamp member when it is desired to remove the clamp member from the construction, as for the purpose of repair.

The drive pin 39 is a simple, straight, pin-like projection fixed to and projecting longitudinally from the crank 37 at a point radially offset from the pivotal axis of the crank. The drive pin 39 projects from the crank to slidably enter the opening 43 in the projection 38 on the clamp member.

The hand lever 40 is a simple, straight, bar-like element which is fixed to and projects from the other end of the shaft 36. The hand lever 40 is adapted to be engaged by the hand of an operator to rotate the shaft, crank and drive pin in a manner to urge the clamp member C vertically into and out of tight wedging and sealing engagement between the seating face 17 of the body and the valve element B, which engagement urges the valve member B into and out of tight clamped and sealing engagement against the seating face 16 in the body A.

In the case illustrated, the hand lever 40 is provided with an opening 45 at one end, through which the shaft 36 is engaged. A simple lock pin 46 is engaged through the lever arm 40 and the shaft 36 to secure the arm and shaft together against relative rotation and displacement.

With the construction set forth above, it will be apparent that when it is desired to shut off the flow of fluid through the valve body A, the imperforate end portion 25 of the valve member B is positioned within the chamber 15 between the seating face 16 and the clamp member C, whereupon the clamp member C is urged downwardly into tight clamped and seating engagement in the body and against the valve element C by the actuating means E. When it is desired to establish flow through the body A, the clamp member C is retracted by the means E, the valve element B is removed from the chamber 15, turned end-for-end and engaged in the chamber 15 again, with the apertured end portion thereof engaged in the chamber, whereupon operation of the actuating means again urges the clamp member C into tight clamping and sealing engagement with the body A and the valving element C.

In practice, the actuating means is designed so that the clamp member is shifted from a fully engaged or actuated position in the body to a fully loosened position by rotation of the hand lever 40, shaft 36 and crank 37, through 180°.

It will be apparent from the foregoing, that I have provided a novel visible plate valve construction which involves a minimum number of parts, a construction which is easy and economical of manufacture, and a construction which is fast, effective and dependable in operation.

Having described only a typical preferred form and application of my invention, I do not wish to be limited or restricted to the specific details herein set forth, but wish to reserve to myself any modifications or variations that may occur to those skilled in the art and fall within the scope of the following claims.

Having described my invention, I claim:

1. A plate valve comprising a body with a longitudinal flow passage extending therethrough, an enlargement intermediate the ends of the body and defining a laterally opening chamber extending transversely of the body and intersecting the flow passage, substantially opposed, longitudinally spaced relatively inclined seating faces in the chamber, a valve member having an imperforate end portion and an apertured end portion, said valve member being adapted to be related to the body with one of said end portions engaged in the chamber adjacent one of said seating faces, a rigid annular wedge shaped clamp element positioned within the chamber between the other seating face and the valve member and movable transversely with respect to said flow passage, and crank and lever actuating means carried by the body and operatively coupled to the clamp member so that the clamp member is moved thereby transversely with respect to said flow passage into tight wedging engagement with the seating face adjacent thereto and into clamped engagement with said valve member.

2. A plate valve comprising a body having a longitudinal flow passage extending therethrough and an enlargement defining a laterally opening chamber extending transversely of the body and intersecting the flow passage, opposed, longitudinally spaced seating faces in the chamber, one of said seating faces being normal to the longitudinal axis of the body, the other seating face being inclined relative to the longitudinal axis of the body, a valve plate having an imperforate end portion and an apertured end portion, said valve plate being adapted to be related to the body with one of said end portions engaged in the chamber adjacent said one seating face, a rigid annular wedge-shaped clamp element positioned within the chamber between said other seating face and the valve member and movable laterally of the valve body, and crank and lever actuating means carried by the body and operatively coupled to the clamp member so as to move the clamp member laterally of the valve body into engagement with said valve member.

3. A plate valve comprising a body having upstream and downstream ends, a longitudinal flow passage extending therethrough, and an enlargement intermediate its ends and defining a radially opening chamber extending transversely of the body and intersecting the flow passage, opposed, longitudinally spaced, annular seating faces in the chamber, one of said seating faces being normal to the longitudinal axis of the body, the other seating face being inclined relative to the longitudinal axis of the body and to said one seating face, a flat, elongate valve member having an imperforate end portion and an apertured end portion, said valve member being adapted to be related to the body with one of said end portions engaged in the chamber adjacent said one seating face, an annular clamp element within the chamber and having a first flat sealing face and a second flat sealing face converging towards said first sealing face in the direction away from the radial opening of said chamber, said clamp element being positioned between said second seating face and the valve member, and crank and lever actuating means carried by the body and operatively coupled to the clamp member so as to move the clamp member in a plane transverse to said longitudinal axis and into and out of tight clamped and wedging engagement with the body and the valve member.

4. A plate valve of the character referred to including, an elongate body having upstream and downstream ends, a longitudinal flow passage extending therethrough, an enlargement intermediate its ends and defining a laterally opening chamber extending transversely of the body and intersecting the flow passage, opposed, longitudinally spaced upstream and downstream seating faces in the chamber, said upstream seating face being normal to the longitudinal axis of the body, said downstream seating face being inclined relative to the longitudinal axis of the body, a flat, elongate valve member having an imperforate end portion and an apertured end portion, said valve member being adapted to be related to the body with one of said end portions engaged in the chamber adjacent said upstream seating face, an annular wedge-shaped clamp element positioned within the chamber between the downstream seating face and the valve member, and crank and lever actuating means carried by the body and operatively coupled to the clamp member and adapted to urge the clamp member laterally into and out of tight clamped engagement with said valve member, said actuating means including a shaft rotatably carried by the body, a crank carried by the shaft, a drive pin extending between the crank and the clamp element and a hand lever on the shaft and operable to rotate the shaft and the crank in a manner to shift the clamp element into and out of wedging engagement in the body and against the valve member.

5. A plate valve of the character referred to including, an elongate, horizontally disposed body having upstream and downstream ends and a longitudinal flow passage extending therethrough, an enlargement intermediate its ends and defining an upwardly opening chamber extending transversely of the body and intersecting the flow passage, opposed, longitudinally spaced, annular upstream and downstream seating faces in the chamber, said upstream seating face being normal to the longitudinal axis of the body, said downstream seating face being inclined relative to the longitudinal axis of the body and converging downwardly towards the upstream seating face, a flat, elongate, vertically disposed valve member having an imperforate end portion and an apertured end portion, said valve member being adapted to be related to the body with one of said end portions engaged in the chamber adjacent said upstream seating face, an annular clamp element having a flat, vertically disposed upstream sealing face and an inclined downstream sealing face converging downwardly towards said upstream sealing face, said clamp element being positioned within the chamber between the inclined downstream seating face and the valve member, and crank and lever actuating means carried by the body and operatively coupled to the clamp member and adapted to urge the clamp member vertically into and out of tight clamped and wedging engagement with the body and the valve member, said actuating means including, a bearing block having a bearing opening fixed to the top of the extension on the body adjacent the downstream side of the chamber defined thereby and with said bearing opening extending parallel and in a common vertical plane with the central longitudinal axis of the body, a shaft rotatably engaged in the bearing opening and projecting from the opposite ends of the block, a crank fixed to the end of the shaft adjacent the upper open end of the chamber, an apertured projection on the top of the clamp element, a drive pin projecting from the crank and slidably engaged in said apertured projection and a hand lever at the other end of the shaft and engageable to rotate the shaft and the crank and to thereby shift the clamp element relative to the body.

6. A plate valve of the character referred to including, an elongate, horizontally disposed body having upstream and downstream ends and a longitudinal flow passage extending therethrough, an enlargement intermediate its ends and defining an upwardly opening chamber extending transversely of the body and intersecting the flow passage, opposed, longitudinally spaced annular upstream and downstream seating faces in the chamber, said upstream seating face being normal to the longitudinal axis of the body, said downstream seating face being inclined relative to the longitudinal axis of the body and converging downwardly towards the upstream seating face, a flat, elongate, vertically disposed valve member having an imperforate end portion and an apertured end portion, said valve member being adapted to be related to the body with one of said end portions engaged in the chamber adjacent said upstream seating face, an annular clamp element having a flat, vertically disposed upstream sealing face and an inclined downstream sealing face converging downwardly towards said upstream sealing face, said clamp element being positioned within the chamber between the inclined downstream seating face and the valve member, crank and lever actuating means carried by the body and operatively coupled to the clamp member and adapted to urge the clamp member vertically into and out of tight clamping and wedging engagement with the body and the valve member, and sealing means adapted to seal between the upstream seating face and the valve member and including annular grooves in the upstream sealing face of the valve member and at the opposite end portions thereof, and an annular sealing ring in each of the grooves and normally projecting therefrom and adapted to establish fluid tight sealing engagement with the body when the associated end portion of the valve member is urged tight against the said upstream seating face by the clamp element.

7. A plate valve of the character referred to including, an elongate, horizontally disposed body having upstream and downstream ends and a longitudinal flow passage extending therethrough, an enlargement intermediate its ends and defining an upwardly opening chamber extending transversely of the body and intersecting the flow passage, opposed longitudinally spaced annular upstream and downstream seating faces in the chamber, said upstream seating face being normal to the longitudinal axis of the body, said downstream seating face being inclined relative to the longitudinal axis of the body and converging downwardly towards the upstream seating face, a flat, elongate, vertically disposed valve member having an imperforate end portion and an apertured end portion, said valve member being adapted to be related to the body with one of said end portions engaged in the chamber adjacent said upstream seating faces, an annular clamp element having a flat, vertically disposed upstream sealing face and an inclined downstream sealing face converging downwardly towards said upstream sealing face, said clamp element being positioned within the chamber between the inclined downstream seating face and the valve member, crank and lever actuating means carried by the body and operatively coupled to the clamp member and adapted to urge the clamp member vertically into and out of tight clamping and wedging engagement with the body and the valve member, and sealing means adapted to seal between the valve member, the clamp element and the body and including oppositely disposed annular grooves in the sealing faces in the opposite end portions of the valve member, an annular groove in the downstream sealing face of the clamp element, and sealing rings in the grooves normally projecting therefrom and adapted to establish fluid tight sealing engagement with the opposing surfaces of the construction when the clamp element is urged into tight wedging engagement in the construction.

8. A plate valve of the character referred to including, an elongate, horizontally disposed body having upstream and downstream ends and a longitudinally flow passage extending therethrough, an enlargement intermediate its ends and defining an upwardly opening chamber extending transversely of the body and intersecting the flow passage, opposed, longitudinally spaced, annular upstream and downstream seating faces in the chamber, said upstream seating face being normal to the longitudinal axis of the body, said downstream seating face being inclined relative to the longitudinal axis of the body and converging downwardly towards the upstream seating face, a flat, elongate, vertically disposed valve member having an imperforate end portion and an apertured end portion, said valve member being adapted to be related to the body with one of said end portions engaged in the chamber adjacent said upstream seating face, an annular clamp element having a flat, vertically disposed upstream sealing face and an inclined downstream sealing face converging downwardly towards said upstream sealing face, said clamp element being positioned within the chamber between the inclined downstream seating face and the valve member, crank and lever actuating means carried by the body and operatively coupled to the clamp member and adapted to urge the clamp member vertically into and out of tight clamping and wedging engagement with the body and the valve member, said actuating means including, a bearing block having a bearing opening fixed to the top of the extension on the body adjacent the downstream side of the chamber defined thereby and with said bearing opening extending parallel and in a common vertical plane with the central longitudinal axis of the body, a shaft rotatably engaged in the bearing opening and projecting from the opposite ends of the block, a crank fixed to the end of the shaft adjacent the upper open end of the chamber, an apertured projection on the top of the clamp element, a drive pin projecting from the crank and slidably engaged in said apertured projection, and a hand lever at the other end of the shaft and engageable to rotate the shaft and the crank and to thereby shift the clamp element relative to the body, and sealing means adapted to seal between the valve member, clamp element and the body and including, oppositely disposed, annular grooves in the opposite end portions of the valve member, an annular groove in the downstream sealing face of the clamp element, and sealing rings in the grooves normally projecting therefrom and adapted to establish fluid tight sealing engagement with the opposing surfaces of the construction when the clamp element is urged into tight wedging engagement in the construction.

References Cited in the file of this patent

UNITED STATES PATENTS

| | | |
|---|---|---|
| 2,664,918 | Hamer | Jan. 5, 1954 |
| 2,743,742 | Muff | May 1, 1956 |
| 2,800,926 | Handley | July 30, 1957 |